United States Patent [19]

Ito

[11] Patent Number: 5,059,236

[45] Date of Patent: Oct. 22, 1991

[54] APPARATUS FOR COOLING A BLANK MOLD IN A GLASS RECEPTACLE FORMING MACHINE WITH MULTIPLE DAMPERS

[75] Inventor: Yoshifumi Ito, Tokyo, Japan

[73] Assignee: Toyo Glass Co., Ltd., Tokyo, Japan

[21] Appl. No.: 594,797

[22] Filed: Oct. 9, 1990

[30] Foreign Application Priority Data

Oct. 27, 1989 [JP] Japan .................................. 1-281166

[51] Int. Cl.$^5$ ............................................ C03B 11/12
[52] U.S. Cl. ...................................... 65/319; 65/356; 425/144
[58] Field of Search ................. 65/355, 356, 267, 137, 65/319, 265; 425/144

[56] References Cited

U.S. PATENT DOCUMENTS 4,278,624 7/1981 Kornylak ............................ 425/144
4,388,099 6/1983 Hermening et al. .................. 65/356

Primary Examiner—Richard V. Fisher
Assistant Examiner—John Hoffmann
Attorney, Agent, or Firm—Sughrue, Mion, Zinn, Macpeak and Seas

[57] ABSTRACT

An apparatus for cooling a blank mold in a glass receptacle forming machine which can adjust the amount of cooling air to be supplied to a blank mold. The apparatus for cooling a blank mold includes a blank mold for forming a glass receptacle, a plurality of passages for cooling air provided in the circumferential wall of the blank mold and piercing through the circumferential wall in a vertical direction. The apparatus further includes a plenum chamber provided adjacent to said passages for temporarily storing cooling air to be supplied to the passages and having at least one inner partition wall therein to define a plurality of cavities and a damper device provided in or adjacent to the plenum chamber for adjusting the amount of cooling air to be supplied to the cavities and having at least one damper, wherein opening degree of the damper is variable so as to adjust the amount of cooling air to be supplied to the passages through the cavities.

7 Claims, 9 Drawing Sheets

APPARATUS FOR COOLING A BLANK MOLD IN A GLASS RECEPTACLE FORMING MACHINE WITH MULTIPLE DAMPERS

BACKGROUND OF THE INVENTION

The present invention relates to an apparatus for cooling a blank mold in a glass receptacle forming machine, and more particularly to an apparatus for cooling a blank mold which can adjust the amount of cooling air to be supplied to a blank mold.

Most glass articles are manufactured by a process in which raw materials are converted by a furnace to molten glass that is then fed to a glass forming machine and formed into the glass articles.

In general, there is a known glass receptacle forming machine in which a gob of molten glass is fed to a mold for forming a parison (hereinafter referred to as blank mold) having a certain shape and then cooled to form a glass receptacle.

In the above glass receptacle forming machine, when molding glass, glass is cooled through the blank mold and the temperature of glass is lowered to the extent that glass is not deformed. The temperature of a gob is often not uniform in part and the coefficient of viscosity of glass is partially different. Therefore, in the glass receptacle forming machine in which air is blown into the blank mold, glass is not expanded uniformly, thereby affecting the glass receptacle wrongly in its thickness distribution. In order to rectify irregular temperature of the gob, glass portion of the high temperature is cooled to make glass molded by the blank mold uniform temperature distribution.

A conventional apparatus for cooling a blank mold is mounted on a main frame 1 through a base plate 3 as shown in FIGS. 16 and 17. The base plate 3 is fixed to the main frame 1 by bolts 5. A damper device 7 is provided below the base plate 3. The damper device 7 is provided with an air cylinder (not shown) having a tip end to which a damper 7a for opening or closing passage for cooling air is attached.

A spherical bearing 11 having an inner race and an outer race is interposed between the base plate 3 and a pipe 9a, the outer race of the spherical bearing 11 is secured to the base plate 3 and the inner race is secured to the pipe 9a. A pipe 9b is fitted with the outer periphery of the pipe 9a, the pipes 9a and 9b are rotatable and slidable with each other, thereby forming connecting conduit 13. Further, a spherical bearing 17 having an inner race and an outer race is interposed between a pipe 9c and a mold supporting device 15. The outer race of the spherical bearing 17 is secured to the mold supporting device 15, and the inner race thereof is secured to the pipe 9c. The pipe 9c and the pipe 9b are fixed by a ring pin 19 in such a manner that when operating in normal condition or replacing components with others, relative fixed position of these two pipes 9c and 9b can be changed.

The mold supporting device 15 has an upper portion to which a pipe 21a is fixed, a pipe 21b is fitted with an outer periphery of the pipe 21a. The pipe 21b is fixed to a plenum chamber 23. The plenum chamber 23 is positioned by a lock pin 27 above one of a plurality of the blank molds 25 supported by the mold supporting device 15. The plenum chamber 23 has cavities therein for temporarily storing cooling air. A cavity 23a and a cavity 23b are in communication with each other.

The plenum chamber 23 has a structure which is divided into a pair of components. In FIGS. 16 and 17, the blank molds 25 are supported at both sides thereof by the mold supporting device 15, the plenum chamber 23 is positioned by the lock pin 27 upside of the blank mold 25. In this type of cooling apparatus, the lock pin 27 is easily removed upward from the mold supporting device 15 so that the blank mold 25 is taken out from the mold supporting device 15.

The air cylinder constituting the damper device 7 is actuated by air pressure signal from a controlling device (not shown), whereby the damper 7a is opened and cooling air flows into the pipe 9a from the frame 1 as show by arrow A. This cooling air A flows into the plenum chamber 23 through each of pipes, and then flows into a plurality of passages 29 for cooling air provided in the blank mold 25 through the cavities 23a and 23b. The cooling air flows into the blank mold 25 from an inlet 29a of the passage 29 and cools the blank mold 25, and then is discharged from an outlet 29b to the outside of the apparatus or the atmosphere. The passages 29 for cooling air are generally formed on a circumferential wall of the blank mold 25 in such a manner that they are positioned on the same circle and at regular intervals and pierce through the wall in a vertical direction.

However, in the conventional cooling apparatus mentioned above, the amount of cooling air and pressure of cooling air supplied into the passages 29 of the blank mold cannot be freely adjusted to a desired value. That is, the amount of cooling air and pressure of cooling air supplied into each of a plurality of passages 29, 29 . . . 29 not only cannot be adjusted, if there are a plurality of the blank molds 25, 25 . . . 25, but the amount of cooling air and pressure of cooling air supplied into each of the blank molds 25 cannot be adjusted. If the amount of cooling air and pressure of cooling air cannot be adjusted, the thickness of the molded glass receptacle cannot be uniformly made to thus cause quality control of the glass receptacle to be difficult and troublesome.

SUMMARY OF THE INVENTION

It is therefore an object of the present invention to provide an apparatus for cooling a blank mold in a glass receptacle forming machine in which the amount of cooling air and pressure of cooling air supplied to the blank mold can be freely adjusted, thereby improving quality of the glass receptacle and increasing output per unit time.

In order to achieve the above object, according to the present invention, there is provided an apparatus for cooling a blank mold in a glass receptacle forming machine including a blank mold for forming a glass receptacle, a plurality of passages for cooling air provided in the circumferential wall of the blank mold and piercing through the circumferential wall in a vertical direction, the apparatus comprising: a plenum chamber provided adjacent to the passages for temporarily storing cooling air to be supplied to the passages, the plenum chamber having at least one inner partition wall therein to define a plurality of cavities; and a damper device provided in or adjacent to the plenum chamber for adjusting the amount of cooling air to be supplied to the cavities, the damper device having at least one damper, wherein opening degree of the damper is variable so as to adjust the amount of cooling air to be supplied to the passages through the cavities.

According to the present invention, adjustment of the opening degree of the damper device enable the amount of cooling air supplied to each of the cavities in the plenum chamber to adjust, whereby the amount of cooling air supplied to the passages of the blank mold can be easily adjusted. In the case where a plurality of blank molds are provided below the plenum chamber, the amount of cooling air supplied to each of the blank molds can be adjusted. Further, the blank mold has therein a plurality of passages for cooling air, the amount of cooling air supplied to each of passages can be adjusted.

DETAILED DESCRIPTION OF THE PREFERRED EMBODIMENTS

An apparatus for cooling a blank mold in a glass receptacle forming machine according to a first embodiment of the present invention will be described below with reference to FIGS. 1 through 5.

Figure 16:
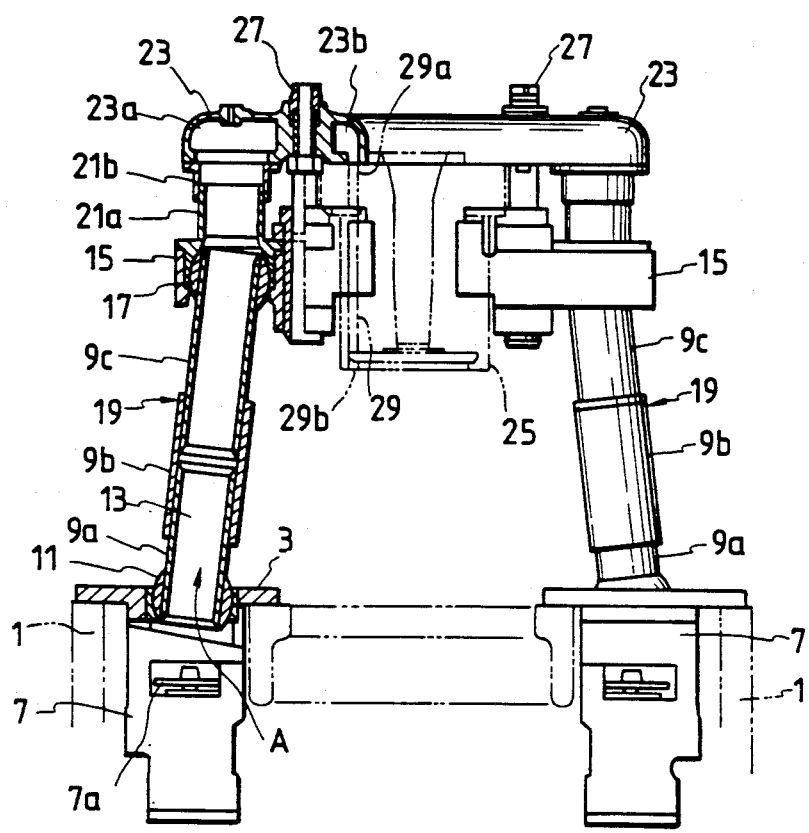
FIG. 16 is a side view including a partial cross sectional view showing a conventional apparatus for cooling a blank mold in a glass receptacle forming machine.
Figure 17:
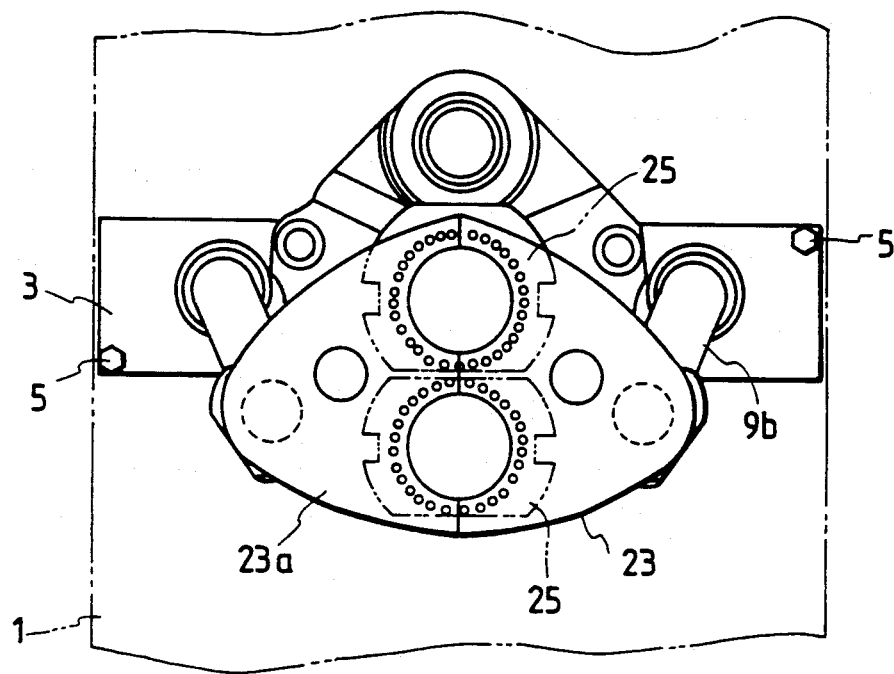
FIG. 17 is a plan view showing a conventional apparatus for cooling a blank mold in a glass receptacle forming machine.

Those parts in FIGS. 1 through 5 which are structurally and functionally identical to those shown in FIGS. 16 and 17 are denoted as identical reference numerals, and will not be described in detail.

Figure 1:
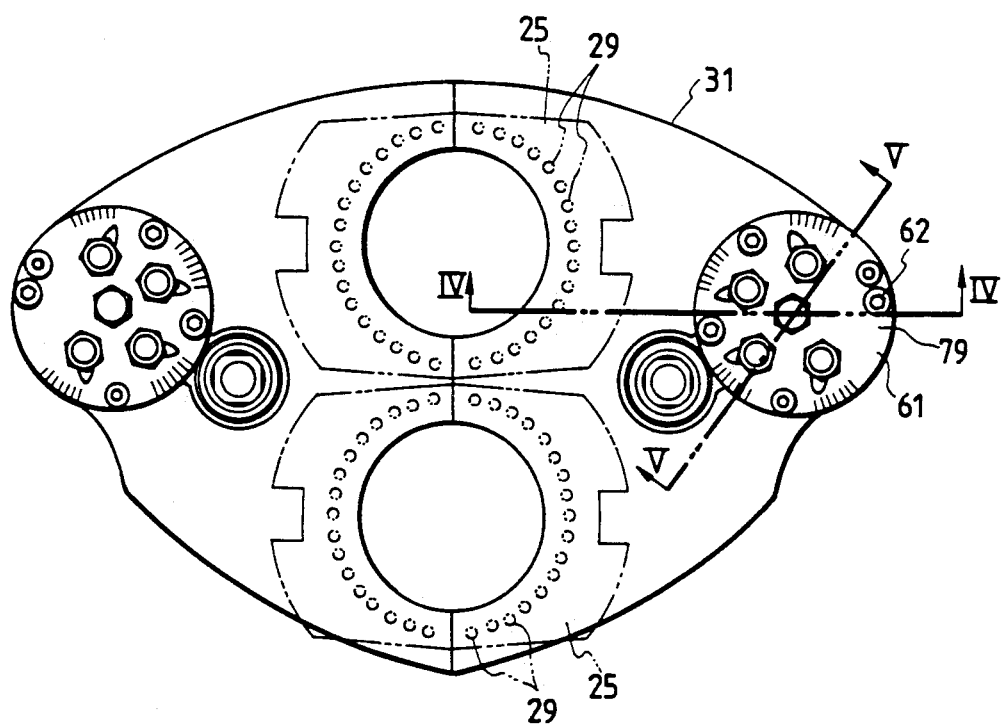
FIG. 1 is a plan view showing an apparatus for cooling a blank mold in a glass receptacle forming machine according to a first embodiment of the present invention.
Figure 2:
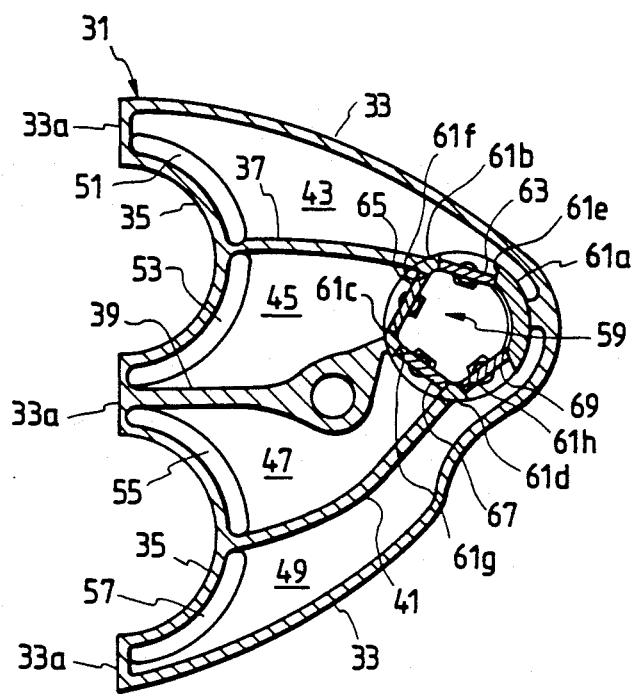
FIG. 2 is a cross sectional view showing a plenum chamber in the apparatus according to a first embodiment of the present invention.

In FIG. 1, a pair of plenum chambers 31, is provided in such a manner that two chambers are adjacent to each other. The plenum chamber 31 has a curved outer wall 33 in the form of a semioval, a pair of semicylindrical walls 35, provided adjacent to each other for accommodating half of the outer periphery of two blank molds 25, and flat walls 33a are provided between the curved outer wall 33 and the pair of semicylindrical walls 35 and adjacent to flat walls of the other plenum chamber 31. The inside of the plenum chamber 31 is partitioned into four cavities 43, 45, 47, 49 by inner partition walls 37, 39, 41. The plenum chamber 31 has a bottom wall on which four slits 51, 53, 55, 57 in the form of an arc are formed, the four cavities 43, 45, 47, 49 are communicated with the outside through the slits 51, 53, 55, 57, respectively. A damper device 59 is provided at the place where the three inner partition walls 37, 39, 41 converge. The damper device 59 is provided with a damper supporting member 61 in the form of a cylinder as shown in FIG. 1. The damper supporting member 61 is fixed to the plenum chamber 31 through bolts 62. The damper supporting member 61 has four partition members 61a, 61b, 61c, 61d between which four openings 61e, 61f, 61g, 61h are formed.

Figure 3:
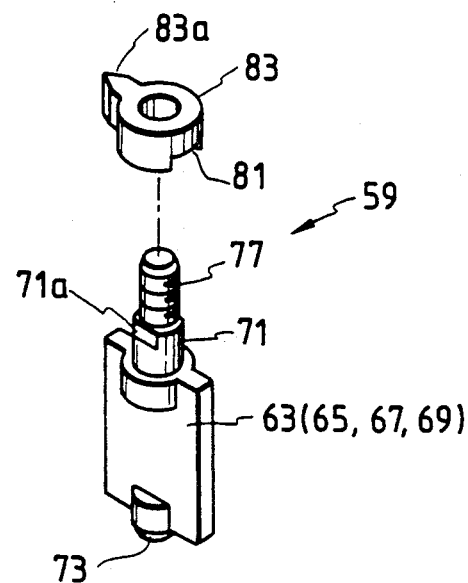
FIG. 3 is an exploded perspective view showing a damper device in the apparatus according to a first embodiment of the present invention.
Figure 4:
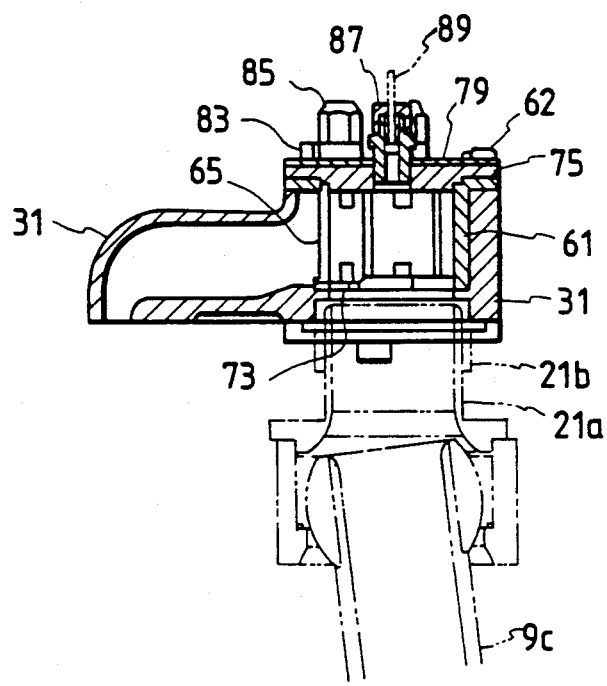
FIG. 4 is a cross sectional view taken along line IV—IV of FIG. 1.
Figure 5:
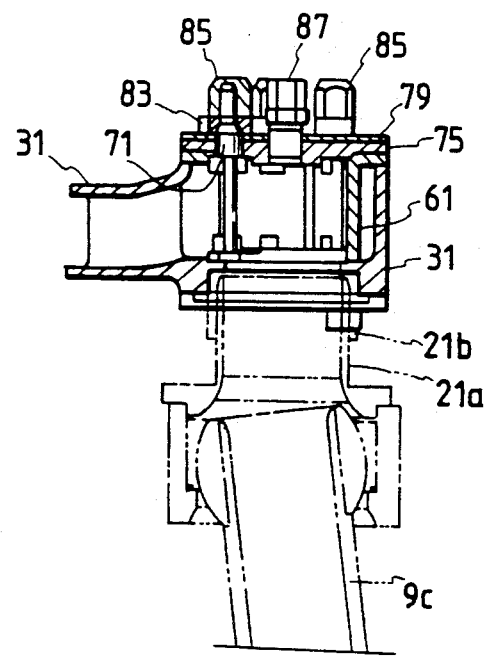
FIG. 5 is a cross sectional view taken along line V—V of FIG. 1; a blank mold in a glass receptacle forming machine according to a second embodiment of the present invention.

Revolving dampers 63, 65, 67, 69 are provided at the openings 61e, 61f, 61g, 61h, respectively in such a manner that the openings 61e, 61f, 61g, 61h can be freely closed by them. The revolving damper 63 (65, 67, 69) has integrally an upper shaft 71 and a lower shaft 73 as shown in FIG. 3, the upper shaft 71 is rotatably supported by an upper cover 75 and the lower shaft 73 is also rotatably supported by the bottom portion of the damper supporting member 61. The upper cover 75 is fixed to the upper end of the damper supporting member 61. Parallel surfaces 71a (only one side is shown) which are in parallel with each other are provided at the intermediate portion of the upper shaft 71, and a male screw 77 is formed at the upper portion of the upper shaft 71 as shown in FIG. 3. A thin indication plate 79 on which a scale is indicated is attached to the upper surface of the upper cover 75 as shown in FIGS. 4 and 5. An indicator 83 is fixedly fitted with the upper shaft 71 piercing through the indication plate 79. The indicator 83 has integrally a groove 81 engageable with the parallel surface 71a of the upper shaft 71 and a needle 83a for pointing out. A cap nut 85 is engaged with the male screw 77 piercing through the indicator 83 as shown in FIGS. 4 and 5.

When cooling air is supplied into the plenum chamber 31 through a series of pipes 9c, 21a, 21b shown by imaginary lines the cooling air is supplied into the respective cavities 43, 45, 47, 49 in the condition where the amount of cooling air is adjusted by the damper device 59. The damper device 59 can adjust the amount of cooling air supplied into the cavities 43, 45, 47, 49 in the range from 0% to 100%. Thereafter, the cooling air is discharged to the outside through the slits 51, 53, 55, 57 shown in FIG. 2. Since the circumferential wall portion of the blank mold 25 is positioned immediately below the slits 51, 53, 55, 57 and passages 29 for cooling air are formed on the circumferential wall portion as shown in FIG. 1, the cooling air passing through the slits 51, 53, 55, 57 is discharged to the outside through the passages 29 of the blank mold 25, whereby the circumferential wall portion of the blank mold 25 is moderately cooled. The opening degrees of the dampers 63, 65, 67, 69 are adjusted in such a manner that the cap nut 85 is loosened and the indicator 83 is rotated to cause the dampers 63, 65, 67, 69 to rotate about its central axis. At this time, the needle 83a indicates a certain division of a scale on the indication plate 79. After finishing adjustment of the opening degree of the damper, the cap nut 85 is fastened to press the under surface of the cap nut 85 against the upper surface of the indication plate 79, thereby fixing the damper at the adjusted position. Both contacting surfaces of each of the dampers 63, 65, 67, 69 and each of the four partition members 61a, 61b, 61c, 61d are preferably formed into an arc profile so that the cooling air does not leak from each of the clearances between the dampers 63, 65, 67, 69 and the partition members 61a, 61b, 61c, 61d.

In this embodiment, since the amount of cooling air supplied into each of the cavities 43, 45, 47, 49 can be properly adjusted by adjusting the opening degrees of the dampers 63, 65, 67, 69, the circumferential wall of the blank mold 25 is kept at a uniform temperature, or, according to circumstances, at a desired temperature in accordance with forming work. Accordingly, temperature distribution of the blank formed in the blank mold can be made uniform, thereby improving the quality of the glass receptacle as a product. Further, even if there are a plurality of blank molds, because the differential in quality among products formed in the blank molds 25 can be reduced, the number of products produced can be increased per unit time. Conventionally, the number of products produced per unit time has been limited to a certain range due to lack of uniformity in quality of a part of the blank molds 25. Further, since the cooling degree can be widely adjusted in the embodiment, the product having a shape, which has conventionally been difficult to be molded, can be easily molded.

A pressure indicating device 87 is mounted on the central portion of the upper cover 75 of the damper device 59 as shown in FIG. 4. A pressure indicator 89 is disposed inside the pressure indicating device 87 so as to be movable vertically. The pressure indicator 89 has one end which is positioned inside the cavity of the damper device 59. When the pressure of the cooling air in the cavity becomes high, the indicator 89 ascends upward to indicate a high pressure condition. On the other hand, when the pressure of the cooling air in the cavity becomes low, the indicator 89 decends downward.

A second embodiment of the present invention will be described below with reference to FIGS. 6 through 10.

Figure 6:
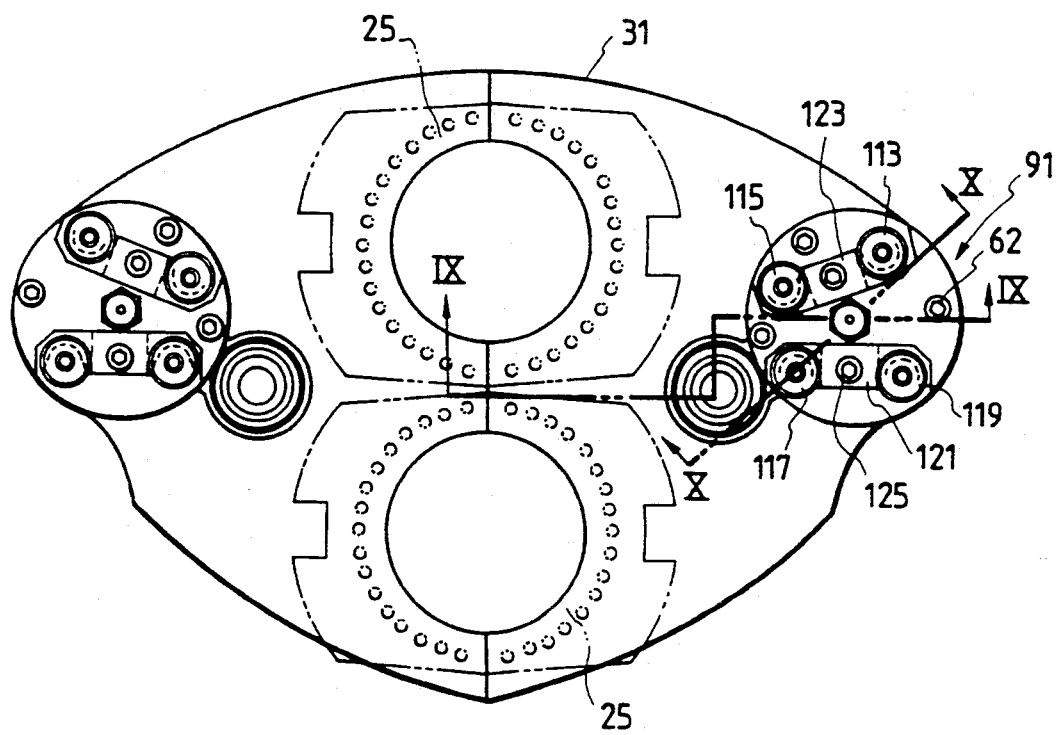
Figure 7:
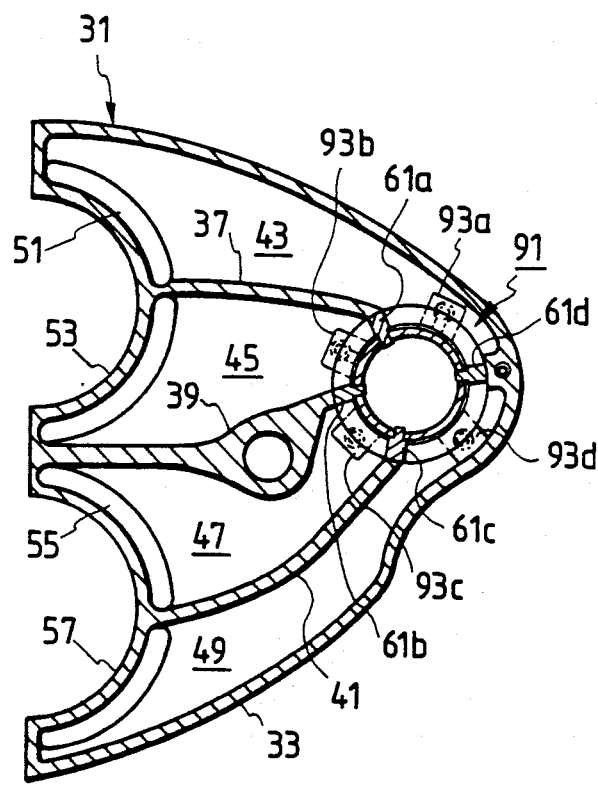
FIG. 7 is a cross sectional view showing a plenum chamber in the apparatus according to a second embodiment of the present invention.
Figure 8:
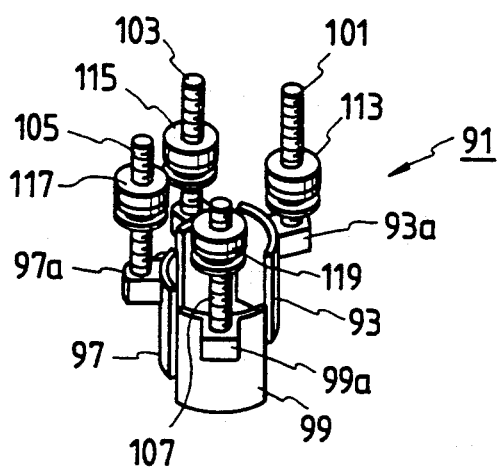
FIG. 8 is an exploded perspective view showing a damper device in the apparatus according to a second embodiment of the present invention.

A damper device 91 is provided at the place where three inner partition walls 37, 39, 41 in the plenum chamber 31 coverage, as shown in FIGS. 6 and 7. The damper device 91 is provided with four dampers 93, 95, 97, 99 which are vertically movable. These dampers 93, 95, 97, 99 are formed into an arc configuration as shown in FIG. 8. Each of the dampers 93, 95, 97, 99 has both longitudinal side edges which are fitted with guide grooves formed on each of the four partition members 61a, 61b, 61c, 61d, each of the dampers 93, 95, 97, 99 is vertically movable supported so that it is smoothly moved 269 from the fully closed position shown in FIG. 9 to the fully opened position shown in FIG. 10.

Figure 9:
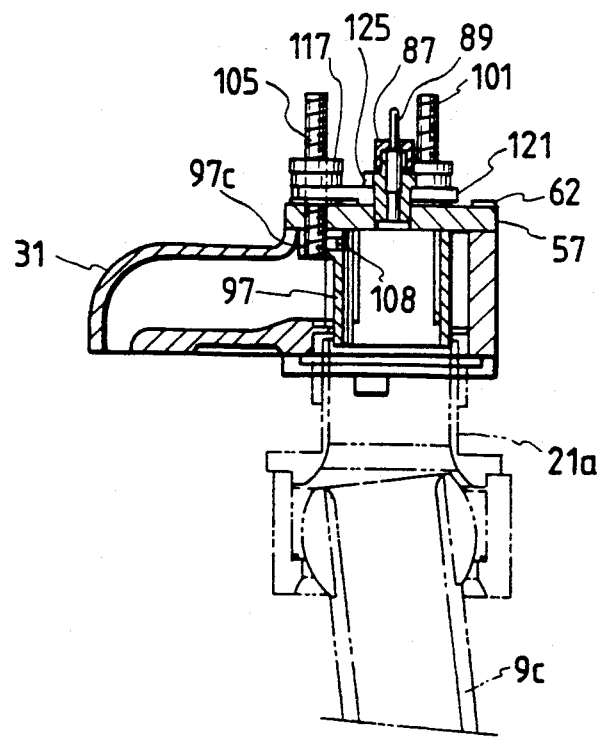
FIG. 9 is a cross sectional view taken along line IX—IX of FIG. 6.
Figure 10:
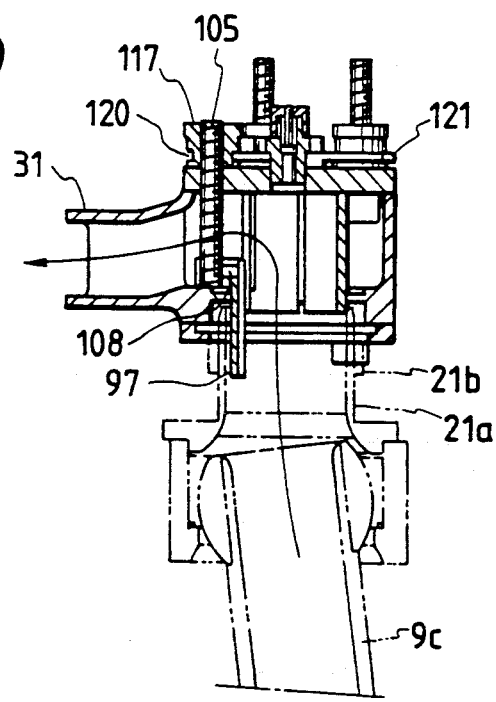
FIG. 10 is a cross sectional view taken along line X—X of FIG. 6.

Bosses 93a, 95a, 97a, 99a are fixed to the upper portions of the dampers 93, 95, 97, 99, respectively as shown in FIGS. 7 and 8. Screw shafts 101, 103, 105, 107 are engaged with the bosses 93a, 95a, 97a, 99a. The screw shafts 101, 103, 105, 107 are fixed to the bosses 93a, 95a, 97a, 99a, respectively, by set screws 108 as shown in FIGS. 9 and 10. The screw shafts 101, 103, 105, 107 extend in a vertical direction so as to pierce through the upper cover 57 of the damper supporting member 61 and the indication plate 79 having a scale thereon in the same way as the first embodiment. Adjusting nuts 113, 115, 117, 119 are engaged with the screw shafts 101, 103, 105, 107, respectively. Further, the adjusting nuts 113, 115, 117, 119 are formed with circumferential grooves 120 on the outer periphery thereof, as shown in FIG. 10. Fixing bars 121, 123, have concave recesses with which the circumferential grooves 120 are engaged as shown in FIG. 6. There is a small clearance between the fixing bars 121, 123 and the upper cover 57. When fastening the bolts 125 in FIG. 6, the fixing bars 121, 123 press the adjusting nuts 113, 115, 117, 119 to fix the adjustment position of the adjusting nuts 113, 115, 117, 119, whereby the dampers 93, 95, 97, 99 are kept at certain opening degrees.

When adjusting opening degrees of the dampers 93, 95, 97, 99, the bolts 125 are loosened, and then the adjusting nuts 113, 115, 117, 119 are rotated. At this time, since the adjusting nuts 113, 115, 117, 119 are held by the fixing bars 121, 123 so as not to move vertically the screw shafts 101, 103, 105, 107 are moved up and down, whereby the dampers 93, 95, 97, 99, are moved vertically. FIG. 10 shows the damper 97 in a fully closed position, at this time, the cooling air is supplied into the plenum chamber 31 through a series of pipes 9c, 21a, 21b shown by imaginary lines, as shown by the arrow. The cooling air is supplied into each of the cavities 43, 45, 47, 49 in the state where the amount of cooling air is controlled by the damper device 91. Thereafter, the cooling air is discharged to the outside through the slits 51, 53, 55, 57. The remaining structure of the second embodiment in FIGS. 6 through 10 is identical to that of the first embodiment in FIGS. 1 through 5.

A third embodiment of the present invention will be described below with reference to FIGS. 11 through 15.

Figure 11:
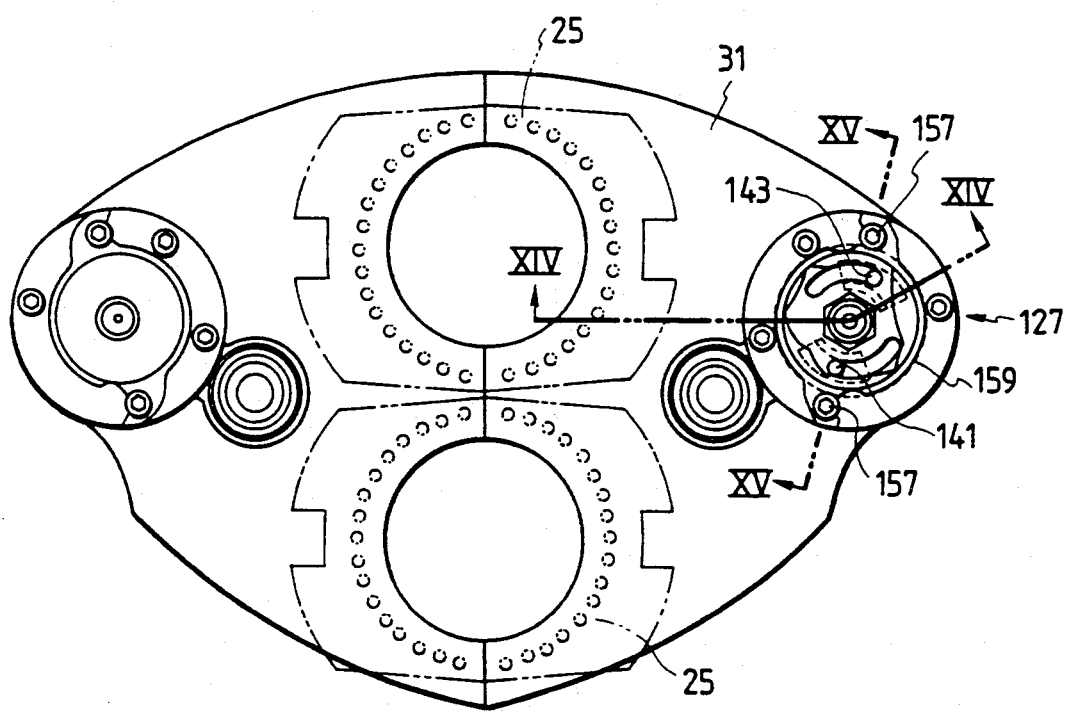
FIG. 11 is a plan view showing an apparatus for cooling a blank mold in a glass receptacle forming machine according to a third embodiment of the present invention.
Figure 12:
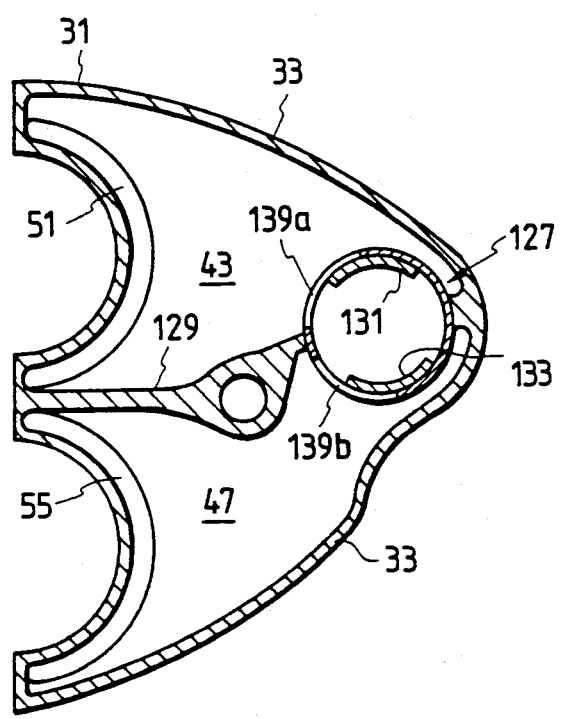
FIG. 12 is a cross sectional view showing a plenum chamber in the apparatus according to a third embodiment of the present invention.
Figure 13:
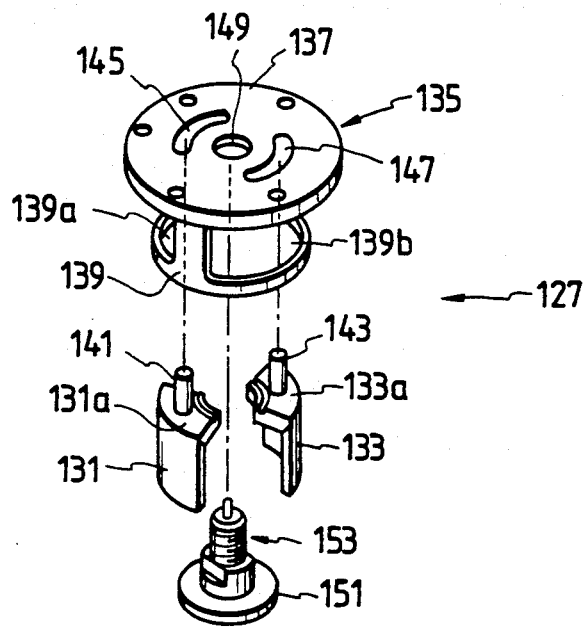
FIG. 13 is an exploded perspective view showing a damper device in the apparatus according to a third embodiment of the present invention.

A damper device 127 is provided at the intermediate portion of a single inner partition wall 129 as shown in FIGS. 11 and 12. The damper device 127 is provided with two dampers 131, 133 which are slidable in a circumferential direction. The dampers 131, 133 are formed integrally with upper flanges 131a, 133a projecting inward from damper bodies. The dampers 131, 133 are fitted with the inner circumferential surface of a damper supporting member 135 as shown in FIG. 13. The damper supporting member 135 comprises a fastening flange 137, and a holder 139 formed integrally with the flange 137 and extending downward from the lower surface of the flange 137. The holder 139 is formed with two openings 139a, 139b which are freely closed by the dampers 131, 133.

Adjusting pins 141, 143 are fixed to the upper flanges 131a, 133a of the dampers 131, 133. The adjusting pins 141, 143 are loosely fitted with curved oval holes 145, 147.

Figure 14:
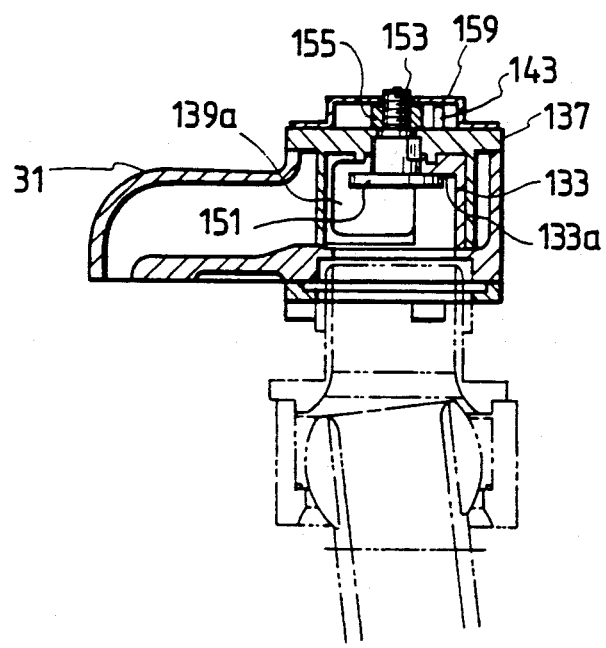
FIG. 14 is a cross sectional view taken along line XIV—XIV of FIG. 11.
Figure 15:
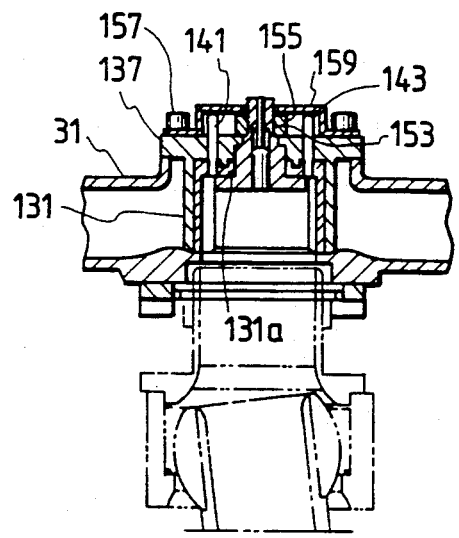
FIG. 15 is a cross sectional view taken along line XV—XV of FIG. 11.

Further, a central through hole 149 is provided at the central portion of the fastening flange 137. A bolt 153 having a flange 151 is inserted into the central through hole 149 as shown in FIGS. 14 and 15. A nut 155 is engaged with the tip end portion of the bolt 153. With this structure, the upper flanges 131a, 133a of the dampers 131, 133 are positioned between the flange 151 of the bolt 153 and the fastening flange 137 (see FIG. 15). Therefore, when fastening the nut 155, the upper flanges 131a, are sandwiched between the flange 151 of the bolt 153 and the fastening flange 137, whereby the dampers 131, 133 are fixed and kept at certain opening degrees. An upper cover 159 is mounted on the fastening flange 137 by nuts 157, as shown in FIG. 11. The upper cover 159 can be removed by loosening the nuts 157 slightly and rotating the upper cover 159 by approximately 5 degrees because the upper cover 159 has openings at the fastening positions thereof. After removing the upper cover 159 and loosening the nut 155, the adjusting pins 141 are moved along the curved oval holes 145, 147 to thus slide the dampers 131 in a circumferential direction, whereby the opening degrees of the dampers 131, 133 can be easily adjusted. As a result, effects of the third embodiment are identical to those of the first and second embodiments.

Although the present invention has been explained on the basis of embodiments, it should be noted that many changes and modifications may be made therein, for example, the number of and shape of cavities in the plenum chamber or the like may be changed. As is apparent from the foregoing description, according to the present invention, since the amount of the cooling air supplied to each of the cavities can be properly adjusted by adjusting the opening degree of the damper of the damper device, the circumferential wall of the blank mold can be kept at a uniform temperature, or according to circumstances, at a desired temperature in accordance with forming work. Accordingly, temperature distribution of the blank molded in the blank mold can be made uniform, thereby improving quality of the glass receptacle as product. Further, even if there are a plurality of blank molds, because the differential in quality among products formed in the blank molds can be reduced, the number of production can be increased per unit time. Incidentally, the number of production per unit time has conventionally been limited to a certain range due to a lack of uniformity in quality of a part of the blank mold.

Furthermore, since cooling degree can be widely adjusted in the present invention, the product having a shape, which has conventionally been difficult to be molded, can be easily molded.

Although, certain preferred embodiments have been shown and described, it should be understood that many changes and modifications may be made therein without departing from the scope of the appended claims.

What is claimed is:

1. An apparatus for cooling a blank mold in a glass receptacle forming machine including a blank mold for forming a glass receptacle, a plurality of passages for providing cooling air in a circumferential wall of the blank mold and extending vertically through the circumferential wall, the apparatus comprising:

a plenum chamber provided adjacent to said passages for temporarily storing cooling air to be supplied to said passages, said plenum chamber having at least one inner partition wall therein to define a plurality of cavities; and a damper device fixed to said plenum chamber for integrally supporting a plurality of dampers, each of said plurality of dampers being respectively provided for adjusting the amount of cooling air supplied to each said cavity, wherein an opening degree of each of said plurality of dampers is variably controllable so that the amount of cooling air to be supplied to said passages through said cavities is adjustable, wherein said damper device is provided at a site whereat a plurality of said inner partition walls converge.

2. The apparatus for cooling a blank mold in a glass receptacle forming machine as recited in claim 1, wherein each of said plurality of dampers adjusts the amount of cooling air to be respectively supplied to said cavities in the range from 0% to 100% of a maximum amount of the cooling air that could be supplied to said cavities.

3. The apparatus for cooling a blank mold in a glass receptacle forming machine as recited in claim 1, wherein each said damper is rotatable about its central axis to vary said opening degree thereof.

4. The apparatus for cooling a blank mold in a glass receptacle forming machine as recited in claim 1, wherein each said damper is movable in a vertical direction to vary said opening degree thereof.

5. The apparatus for cooling a blank mold in a glass receptacle forming machine as recited in claim 1, wherein each said damper is movable in a lateral direction to vary said opening degree thereof.

6. The apparatus for cooling a blank mold in a glass receptacle forming machine as recited in claim 5, wherein each said damper is moved along a certain curvature.

7. An apparatus for cooling a blank mold in a glass receptacle forming machine including a blank mold for forming a glass receptacle, a plurality of passages for providing cooling air in a circumferential wall of the blank mold and extending vertically through the circumferential wall, the apparatus comprising:

a plenum chamber provided adjacent to said passages for temporarily storing cooling air to be supplied to said passages, said plenum chamber having at least one inner partition wall therein to define a plurality of cavities; and a damper device fixed to said plenum chamber for integrally supporting a plurality of dampers, each of said plurality of dampers being respectively provided for adjusting the amount of cooling air supplied to each said cavity, wherein an opening degree of each of said plurality of dampers is variably controllable so that the amount of cooling air to be supplied to said passages through said cavities is adjustable, wherein said damper device is incorporated in said inner partition wall of said plenum chamber.

* * * * *